United States Patent
Li

(10) Patent No.: US 11,361,659 B2
(45) Date of Patent: Jun. 14, 2022

(54) TRAFFIC LIGHT-BASED VEHICLE SPEED INDUCTION METHOD AND SYSTEM, AND VEHICLE

(71) Applicant: IE-CHENG TECHNOLOGY (TIANJIN) CO., LTD., Tianjin (CN)

(72) Inventor: Chun-Ming Li, Tianjin (CN)

(73) Assignee: IE-CHENG TECHNOLOGY (TIANJIN) CO., LTD., Tianjin (CN)

( * ) Notice: Subject to any disclaimer, the term of this patent is extended or adjusted under 35 U.S.C. 154(b) by 371 days.

(21) Appl. No.: 16/441,117

(22) Filed: Jun. 14, 2019

(65) Prior Publication Data
US 2019/0295411 A1    Sep. 26, 2019

Related U.S. Application Data

(63) Continuation-in-part of application No. PCT/CN2017/100752, filed on Sep. 6, 2017.

(30) Foreign Application Priority Data

Apr. 27, 2017    (CN) .......................... 201710285524.3

(51) Int. Cl.
*G08G 1/00* (2006.01)
*G08G 1/052* (2006.01)
(Continued)

(52) U.S. Cl.
CPC ......... *G08G 1/052* (2013.01); *G01C 21/3469* (2013.01); *G01C 21/3492* (2013.01);
(Continued)

(58) Field of Classification Search
None
See application file for complete search history.

(56) References Cited

U.S. PATENT DOCUMENTS

| 2010/0088002 A1 | 4/2010 | Welte | |
|---|---|---|---|
| 2013/0110316 A1* | 5/2013 | Ogawa | G08G 1/09623 701/1 |
| 2018/0096595 A1* | 4/2018 | Janzen | G06K 9/0063 |

FOREIGN PATENT DOCUMENTS

| CN | 1074547 A | 7/1993 |
|---|---|---|
| CN | 101510360 A | 8/2009 |

(Continued)

OTHER PUBLICATIONS

Chinese Patent Office, first search report of Chinese patent application No. 2017102855243, 2 pages.

(Continued)

*Primary Examiner* — Truc M Do
(74) *Attorney, Agent, or Firm* — MacMillan, Sobanski & Todd, LLC

(57) ABSTRACT

A traffic light-based vehicle speed induction method and system, and a vehicle. The vehicle speed induction method comprises: obtaining the position of an intersection ahead having traffic lights, the current position of vehicle travelling, the current moment, and a time parameter of the traffic lights; determining the distance between the vehicle and the traffic light intersection according to the position of the traffic light intersection and the current position of vehicle travelling; determining an effective time interval for the vehicle to continue travelling according to the time parameter of the traffic lights and the current moment of vehicle travelling; and determining an induction speed range of vehicle travelling according to the distance and the effective time interval.

12 Claims, 2 Drawing Sheets

(51) Int. Cl.
*G01C 21/34* (2006.01)
*G08G 1/01* (2006.01)
*G08G 1/0967* (2006.01)
*G08G 1/0962* (2006.01)
*G08G 1/095* (2006.01)
*G08G 1/07* (2006.01)

(52) U.S. Cl.
CPC ......... *G08G 1/0112* (2013.01); *G08G 1/0962* (2013.01); *G08G 1/096725* (2013.01); *B60W 2554/00* (2020.02); *G08G 1/07* (2013.01); *G08G 1/095* (2013.01); *G08G 1/09623* (2013.01); *G08G 1/096716* (2013.01); *G08G 1/096758* (2013.01); *G08G 1/096783* (2013.01)

(56) References Cited

FOREIGN PATENT DOCUMENTS

| | | |
|---|---|---|
| CN | 102649432 A | 8/2012 |
| CN | 103198686 A | 7/2013 |
| CN | 103909928 A | 7/2014 |
| CN | 104966407 A | 10/2015 |
| CN | 105303857 A | 2/2016 |
| CN | 105551276 A | 5/2016 |
| CN | 106875709 A | 6/2017 |
| WO | 2016055589 A2 | 4/2016 |

OTHER PUBLICATIONS

Chinese Patent Office, p. 1 of the second office action of Chinese patent application No. 2017102855243, 1 page.
European Communication pursuant to Article 94(3) EPC, Application No. 17907023.0, dated Oct. 11, 2019.

* cited by examiner

TRAFFIC LIGHT-BASED VEHICLE SPEED INDUCTION METHOD AND SYSTEM, AND VEHICLE

The present disclosure is continuation-in-part application of international patent application PCT/CN2017/100752, which claims the priority to the Chinese patent application No. 201710285524.3, filed with the Chinese Patent Office on Apr. 27, 2017 and entitled "Traffic Light-based Vehicle Speed Induction Method and System, and Vehicle", which is incorporated herein by reference in its entirety.

TECHNICAL FIELD

The present disclosure relates to the technical field of traffic, and particularly to a traffic light-based vehicle speed induction method and system, and a vehicle.

BACKGROUND ART

At present, a vehicle dashboard displays the current vehicle speed in real time, and a vehicle driver can only adjust the vehicle speed according to the current road condition (for example, the vehicles in the current road section, whether there is an accident or not, etc.) and personal driving experience so as to avoid a red light as much as possible. However, since the condition of the traffic light at the traffic light junction on the road ahead is not known, adjustment of the vehicle speed can only be made at a place very close to the traffic light ahead, the adjustment time is short and the adjustment conditions are limited, easily resulting in vehicle stopping and congestion at the traffic light junction on the road. In addition, due to re-acceleration of the vehicle after the vehicle stopping, when the vehicle crosses the traffic light junction on the road, the speed is low, the time of crossing is long and the energy consumption is high.

SUMMARY

An object of the present disclosure is to provide a traffic light-based vehicle speed induction method, which allows timely adjustment of the vehicle speed and avoids vehicle stopping at a traffic light junction on the road (i.e. a road junction where traffic lights are located).

In order to achieve the above object, the present disclosure provides the following solution:

a traffic light-based vehicle speed induction method, comprising:

acquiring a position of a traffic light junction on the road ahead, a current position and a current time of travelling of a vehicle, and time parameters of a traffic light;

determining the distance between the vehicle and the traffic light junction on the road according to the position of the traffic light junction on the road and the current position of travelling of the vehicle;

determining a plurality of effective time intervals of continued travelling of the vehicle according to the time parameters of the traffic light and the current time of travelling of the vehicle; and determining a plurality of induction speed intervals of travelling of the vehicle according to the distance and the effective time intervals, wherein with a speed within any of the induction speed intervals, a driver can be enabled to cross the traffic light junction on the road during a green-light period.

Optionally, the time parameters include a time period of the traffic light, the starting time of the time period, a green-light period, a yellow-light period and a red-light period in the time period.

Optionally, the step of determining a plurality of effective time intervals of continued travelling of the vehicle according to the time parameters of the traffic light and the current time of travelling of the vehicle specifically comprises:

determining a time remainder according to the following formula:

the time remainder=(the current time−the starting time) % the time period, where % represents a remainder operation;

determining an initial value of the starting time of continued travelling of the vehicle according to the green-light period, the yellow-light period and the red-light period within the time period and the time remainder:

wherein if the time remainder is smaller than the green-light period, the green light at the traffic light junction on the road is currently lit, the initial value of the starting time=0, the initial value of the ending time=the green-light period−the time remainder, and the value is a special case; and for the second green-light period, the initial value of the starting time=the time period−the time remainder, and the initial value of the ending time=the initial value of the starting time+the green-light period;

if the time remainder is greater than the green-light period and smaller than the sum of the green-light period and the yellow-light period, the yellow light at the traffic light junction on the road is currently lit, the initial value of the starting time=the time period−the time remainder, and the initial value of the ending time=the initial value of the starting time+the green-light period;

if the time remainder is greater than the sum of the green-light period and the yellow-light period, the red light at the traffic light junction on the road is currently lit, the initial value of the starting time=the time period−the time remainder, and the initial value of the ending time=the initial value of the starting time+the green-light period;

determining a plurality of effective time intervals $[T_1, T_2]$ according to the following formula:

$$\begin{cases} T_1 = \text{the intial value of the starting time} + nT \\ T_2 = \text{the intial value of the ending time} + nT \end{cases},$$

where $T_1$ represents the starting time in one effective time interval of the continued travelling of the vehicle, $T_2$ represents the ending time in one effective time interval of the continued travelling of the vehicle, T represents the value of one time period of the traffic light, and n is an integer greater than or equal to 0; and if the green light at the traffic light junction on the road is currently lit, the initial value of the starting time and the initial value of the ending time in the formula are the initial value of the starting time and the initial value of the ending time of the second period, and the first set of data is calculated separately as a special case.

Optionally, the step of determining a plurality of induction speed intervals of travelling of the vehicle according to the distance and the effective time intervals specifically comprises:

determining multiple pairs of extreme speed values $v_i$ according to the following formula:

$$v_i = \frac{S}{T_i},$$

where S represents the distance between the vehicle and the traffic light junction on the road, i=1, 2;

determining a plurality of induction speed intervals $[V_2, V_1]$ according to the following formula:

$$\begin{cases} V_1 = \begin{cases} V_H, & v_1 > V_H \\ v_1, & V_L \leq v_1 \leq V_H \\ \text{invalid value}, & v_1 < V_L \end{cases} \\ V_2 = \begin{cases} V_L, & v_2 < V_L \\ v_2, & V_H \geq v_2 \geq V_L \\ \text{invalid value}, & v_2 > V_H \end{cases} \end{cases}$$

wherein the maximum speed limit of the vehicle is represented by $V_H$, and the minimum speed limit of the vehicle is represented by $V_L$; and the reason why there is the invalid value is that in the case where the lowest speed value of the speed interval is higher than the maximum speed limit of the vehicle or the maximum speed limit is lower than the minimum speed limit of the vehicle, the calculation of the speed interval makes no sense and no calculation is made.

Optionally, the step of acquiring a position of a traffic light junction on the road ahead is specifically: determining the position of the traffic light junction on the road according to the GPS coordinates of the traffic light junction on the road.

Optionally, the vehicle speed induction method further comprises:

displaying the induction speed intervals by a dashboard.

Optionally, the induction speed intervals are displayed in green.

According to the specific embodiments provided in the present disclosure, the present disclosure achieves the following technical effects:

In the traffic light-based vehicle speed induction method of the present disclosure, the distance between a vehicle and a traffic light junction on the road ahead is determined according to the position of the traffic light junction on the road and the current position of travelling of the vehicle, a plurality of effective time intervals of continued travelling of the vehicle is determined according to the time parameters of the traffic light and the current time of travelling of the vehicle; and a plurality of induction speed intervals of travelling of the vehicle are further determined according to the distance and the effective time interval, so that a driver can always cross the traffic light junction on the road during the green-light period when driving at a speed within the induction speed intervals, so as to avoid vehicle stopping and causing congestion at the traffic light junction on the road ahead.

An object of the present disclosure is to provide a traffic light-based vehicle speed induction system, which allows timely adjustment of the vehicle speed and avoids vehicle stopping at a traffic light junction on the road.

In order to achieve the above object, the present disclosure provides the following solution:

a traffic light-based vehicle speed induction system, comprising:

an acquisition unit for acquiring a position of a traffic light junction on the road ahead, a current position and a current time of travelling of a vehicle, and time parameters of a traffic light;

a distance determination unit for determining the distance between the vehicle and the traffic light junction on the road according to the position of the traffic light junction on the road and the current position of travelling of the vehicle;

a time determination unit for determining a plurality of effective time intervals of continued travelling of the vehicle according to the time parameters of the traffic light and the current time of travelling of the vehicle; and a speed determination unit for determining a plurality of induction speed intervals of travelling of the vehicle according to the distance and the effective time intervals, wherein with a speed within any of the induction speed intervals, a driver can be enabled to cross the traffic light junction on the road during the green-light period.

An object of the present disclosure is to provide a vehicle, which allows timely adjustment of the vehicle speed and avoids vehicle stopping at a traffic light junction on the road.

In order to achieve the above object, the present disclosure provides the following solution:

a vehicle provided with the traffic light-based vehicle speed induction system as described above.

Optionally, the vehicle is further provided with a dashboard connected to the traffic light-based vehicle speed induction system and used for displaying a plurality of induction speed intervals of the vehicle speed induction system.

Compared with the prior art, the traffic light-based vehicle speed induction system and the vehicle of the present disclosure have the same advantageous effects as the traffic light-based vehicle speed induction method, which will not be described again herein.

BRIEF DESCRIPTION OF DRAWINGS

Below, the present disclosure is further described with reference to the drawings.

REFERENCE SIGNS acquisition unit—1, distance determination unit—2, time determination unit—3, and speed determination unit—4.

DETAILED DESCRIPTION OF EMBODIMENTS

The technical solutions in the embodiments of the present disclosure will be specifically described below with reference to the drawings of the embodiments of the present disclosure. Obviously, the embodiments described are only some of the embodiments of the present disclosure, rather than all of the embodiments of the present disclosure. All the other embodiments that are obtained by a person of ordinary skills in the art on the basis of the embodiments of the present disclosure without inventive effort shall be covered by the protection scope of the present disclosure.

A traffic light includes a red light, a yellow light and a green light. To stop at a red light and go at a green light is the rule that a vehicle must obey when coming to a traffic light junction on the road. A vehicle has only two states, i.e., running and stopping, when arriving at a traffic light junction on the road. In the present disclosure, the concept of traffic light junction on the road is expanded to a road section, the information of traffic light is converted into different speed intervals and a prompt is given by means of a dashboard, etc., so that a vehicle arrives at a traffic light junction on the road during the green-light period through the speed adjustment during travelling, so as to avoid stopping at the traffic light junction on the road.

An object of the present disclosure is to provide a traffic light-based vehicle speed induction method, in which the distance between a vehicle and a traffic light junction on the road ahead is determined according to the position of the traffic light junction on the road and the current position of travelling of the vehicle, a plurality of effective time intervals of continued travelling of the vehicle are determined according to the time parameters of the traffic light and the current time of travelling of the vehicle; and a plurality of induction speed intervals of travelling of the vehicle are further determined according to the distance and the effective time intervals, so that a driver can always cross the traffic light junction on the road during the green-light period when driving at a speed within the induction speed intervals, so as to avoid vehicle stopping and causing congestion at the traffic light junction on the road ahead; moreover, since vehicle stopping is avoided, the energy consumption of the vehicle is reduced.

In order to make it easier to understand the objects, features and advantages of the present disclosure, detailed description is made on the present disclosure below in connection with the embodiments with reference to the accompanying drawings.

Figure 1:
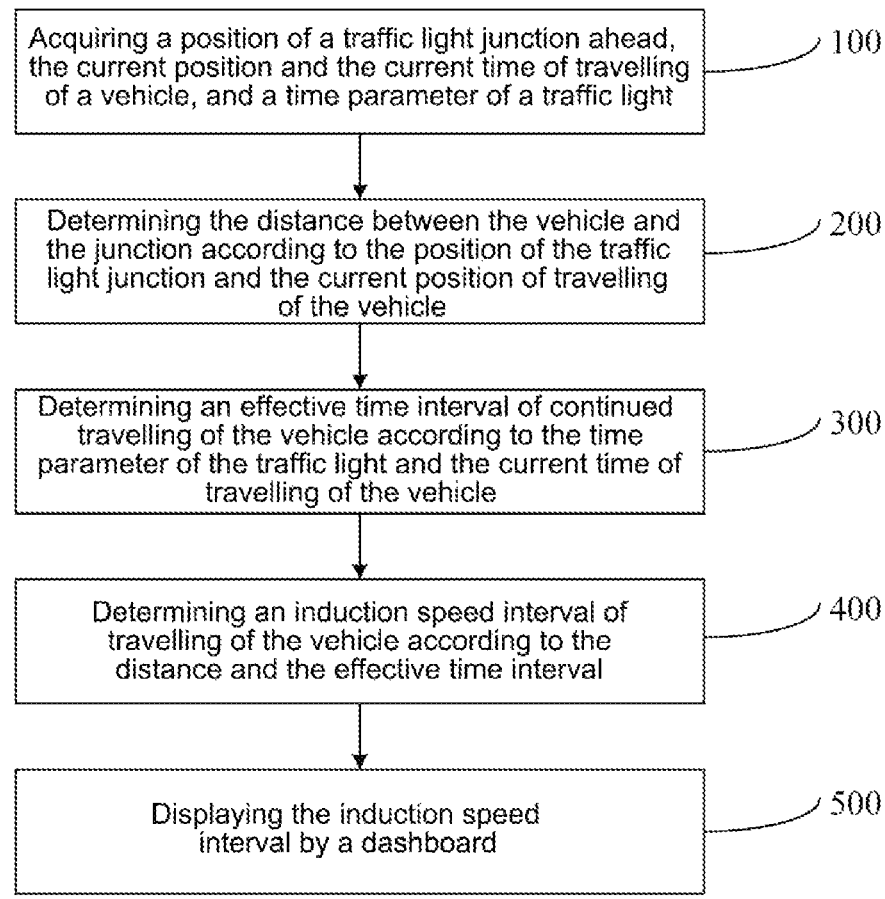
FIG. 1 is a flowchart of a traffic light-based vehicle speed induction method according to an embodiment of the present disclosure.

As shown in FIG. 1, the traffic light-based vehicle speed induction method according to the present disclosure comprises:

step 100: acquiring a position of a traffic light junction on the road ahead, a current position and a current time of travelling of a vehicle, and time parameters of a traffic light;

step 200: determining the distance between the vehicle and the traffic light junction on the road according to the position of the traffic light junction on the road and the current position of travelling of the vehicle;

step 300: determining a plurality of effective time intervals of continued travelling of the vehicle according to the time parameters of the traffic light and the current time of travelling of the vehicle;

step 400: determining a plurality of induction speed intervals of travelling of the vehicle according to the distance and the effective time intervals, wherein with a speed within any of the induction speed intervals, a driver can be enabled to cross the traffic light junction on the road during the green-light period; and step 500: displaying the induction speed intervals by a dashboard. Preferably, the induction speed intervals are displayed in green.

In the above, the acquiring a position of a traffic light junction on the road ahead is specifically: determining the position of the traffic light junction on the road according to the GPS coordinates of the traffic light junction on the road.

In step 200, the determining the distance between the vehicle and the traffic light junction on the road according to the position of the traffic light junction on the road and the current position of travelling of the vehicle is specifically calculating the distance between the vehicle and the traffic light junction on the road ahead according to the GPS coordinates of the traffic light junction on the road, and the current position coordinates of the vehicle.

The time parameters include a time period of the traffic light, the starting time of the time period, a green-light period, a yellow-light period and a red-light period in the time period.

In step 300, the determining a plurality of effective time intervals of continued travelling of the vehicle according to the time parameters of the traffic light and the current time of travelling of the vehicle specifically comprises:

determining a time remainder according to the following formula:

the time remainder=(the current time−the starting time) % the time period, where % represents a remainder operation;

determining an initial value of the starting time of continued travelling of the vehicle according to the green-light period, the yellow-light period and the red-light period within the time period and the time remainder:

wherein if the time remainder is smaller than the green-light period, the green light at the traffic light junction on the road is currently lit, the initial value of the starting time=0, the initial value of the ending time=the green-light period−the time remainder, and the value is a special case; and for the second green-light period, the initial value of the starting time=the time period−the time remainder, and the initial value of the ending time=the initial value of the starting time+the green-light period;

if the time remainder is greater than the green-light period and smaller than the sum of the green-light period and the yellow-light period, the yellow light at the traffic light junction on the road is currently lit, the initial value of the starting time=the time period−the time remainder, and the initial value of the ending time=the initial value of the starting time+the green-light period;

if the time remainder is greater than the sum of the green-light period and the yellow-light period, the red light at the traffic light junction on the road is currently lit, the initial value of the starting time=the time period−the time remainder, and the initial value of the ending time=the initial value of the starting time+the green-light period;

determining a plurality of effective time intervals $[T_1, T2]$ according to the following formula:

$$\begin{cases} T_1 = \text{the intial value of the starting time} + nT \\ T_2 = \text{the intial value of the ending time} + nT \end{cases},$$

where $T_1$ represents the starting time in one effective time interval of the continued travelling of the vehicle, $T_2$ represents the ending time in one effective time interval of the continued travelling of the vehicle, T represents the value of one time period of the traffic light, and n is an integer greater than or equal to 0; and if the green light at the traffic light junction on the road is currently lit, the initial value of the starting time and the initial value of the ending time in the formula are the initial value of the starting time and the initial value of the ending time of the second period, and the first set of data is calculated separately as a special case.

Neither the yellow light nor the red light is taken into consideration in the case of the vehicle crossing the traffic light junction on the road ahead. When a red light or a yellow light is on at the traffic light junction on the road ahead, it is necessary to find the green-light starting time and the green-light ending time, namely the initial value of the starting time and the initial value of the ending time, of the next time period.

In step 400, the determining a plurality of induction speed intervals of travelling of the vehicle according to the distance and the effective time intervals specifically comprises:

determining multiple pairs of extreme speed values $v_i$ according to the following formula:

$$v_i = \frac{S}{T_i},$$

where S represents the distance between the vehicle and the traffic light junction on the road, i=1, 2;

determining a plurality of induction speed intervals [$V_2$, $V_1$] according to the following formula:

$$\begin{cases} V_1 = \begin{cases} V_H, & v_1 > V_H \\ v_1, & V_L \leq v_1 \leq V_H \\ \text{invalid value,} & v_1 < V_L \end{cases} \\ V_2 = \begin{cases} V_L, & v_2 < V_L \\ v_2, & V_H \geq v_2 \geq V_L \\ \text{invalid value,} & v_2 > V_H \end{cases} \end{cases}$$

wherein the maximum speed limit of the vehicle is represented by $V_H$, and the minimum speed limit of the vehicle is represented by $V_L$; and the reason why there is the invalid value is that in the case where the lowest speed value of the speed interval is higher than the maximum speed limit of the vehicle or the maximum speed limit is lower than the minimum speed limit of the vehicle, the calculation of the speed interval makes no sense and no calculation is made.

Detailed description is made below in connection with one specific embodiment (in which the maximum speed limit of the vehicle is 90 km/h, and the minimum speed limit is 15 km/h).

For example, according to the position of the traffic light junction on the road ahead and the current position of travelling of the vehicle, it is determined that the distance between the vehicle and the traffic light junction on the road is 1500 m; the starting time of the time period of the traffic light is $t_1$=2017-04-7, 15:00:34, the green-light period is g=30 s, the yellow-light period is y=6 s, the red-light period is r=36 s, the time period is T=72 s, the current time is: $t_2$=2017-04-07, 15:09:20.

The time remainder is d=($t_2-t_1$)% T=22.

Since d<g, the traffic light ahead is green, and the initial value $T_{1initial}$, of the starting time and the initial value $T_{2initial}$, of the ending time are calculated according to the method of special case:

$T_{1initial}$=0 s, $T_{2initial}$=g−d=8 s, the initial value $T_{1inital}$ of the starting time and the initial value $T_{2initial}$ of the ending time of the second period are calculated:

$T_{1initial}$=T−d=50 s, $T_{2initial}$=$T_{1initial}$+g=80 s;

and a plurality of effective time intervals [$T_1$, $T_2$] are:

$$\begin{cases} T_1 = T_{1initial} + nT \\ T_2 = T_{2initial} + nT \end{cases},$$

where $T_1$ represents the starting time in one effective time interval of the continued travelling of the vehicle, $T_2$ represents the ending time in one effective time interval of the continued travelling of the vehicle, T represents the value of one time period of the traffic light, and n is an integer greater than or equal to 0: Because the green light at the traffic light junction on the road is currently lit, the initial value of the starting time and the initial value of the ending time in the formula are the initial value of the starting time and the initial value of the ending time of the second period, and the first set of data is calculated separately as a special case.

the induction speed intervals are calculated according to [$T_1$, $T_2$]:

the first set of data is special case data, [$T_1$, $T_2$]=[0, 8], $$v_2 = \frac{s}{T_2} = 600 \text{ km/h},$$

since v.sub.2>90 km/h this set of data is invalid, and therefore, the induction speed interval cannot be displayed;

when n=0, [$T_1$, $T_2$]=[50, 80], $$v_1 = \frac{s}{T_1} = 108 \text{ km/h},$$

since $v_1$>90 km/h, then $V_1$=90 km/h;

$$v_2 = \frac{s}{T_2} = 68 \text{ km/h},$$

90 km/h≥$v_2$≥.15 km/h, then $V_2$=68 km/h, the induction speed interval at this time is [$V_2$, $V_1$]=[68, 90] (km/h).

When n=1, [$T_1$, $T_2$]=[122, 152], $$v_1 = \frac{s}{T_1} = 44 \text{ km/h},$$

90 km/h≥$v_1$≥.15 km/h, then $V_1$=44 km/h;

$$v_2 = \frac{s}{T_2} = 36 \text{ km/h},$$

90 km/h≥$v_2$≥.15 km/h, then $V_2$=36 km/h, the induction speed interval at this time is [36, 44] (km/h).

When n=2, [$T_1$, $T_2$]=[194, 224], $$v_1 = \frac{s}{T_1} = 28 \text{ km/h},$$

90 km/h≥$v_1$≥.15 km/h, then $V_1$=28 km/h;

$$v_2 = \frac{s}{T_2} = 24 \text{ km/h},$$

90 km/h≥$v_2$≥.15 km/h, then $V_2$=24 km/h, the induction speed interval at this time is [24, 28] (km/h).

When n=3, [$T_1$, $T_2$]=[194, 224], $$v_1 = \frac{s}{T_1} = 20 \text{ km/h},$$

90 km/h≥.$v_1$≥.15 km/h, then $V_1$=20 km/h;

$$v_2 = \frac{s}{T_2} = 18 \text{ km/h},$$

90 km/h≥.$v_2$≥.15 km/h, then $V_2$=18 km/h, the induction speed interval at this time is [18, 20] (km/h).

When n=4, [$T_1$, $T_2$]=[338, 368], $$v_1 = \frac{s}{T_1} = 16 \text{ km/h},$$

90 km h≥.$v_1$≥.15 km/h, then $V_1$=16 km h;

$$v_2 = \frac{s}{T_2} = 15 \text{ km/h},$$

90 km h≥.$v_2$≥.15 km/h, then $V_2$=15 km h, the induction speed interval at this time is [15, 16] (km/h).

When n=5, [$T_1$, $T_2$]=[410, 440], $$v_1 = \frac{s}{T_1} = 13 \text{ km/h},$$

$v_1$<15 km/h, this set of data is invalid, and therefore, the induction speed interval at this time cannot be displayed.

Calculation is continued for the starting time and the ending time in other time periods, and the corresponding extreme speed value until the extreme speed value $v_i$ does not meet the speed limit condition ($v_1$<90 km/h, $v_2$>15 km/h).

Figure 2:
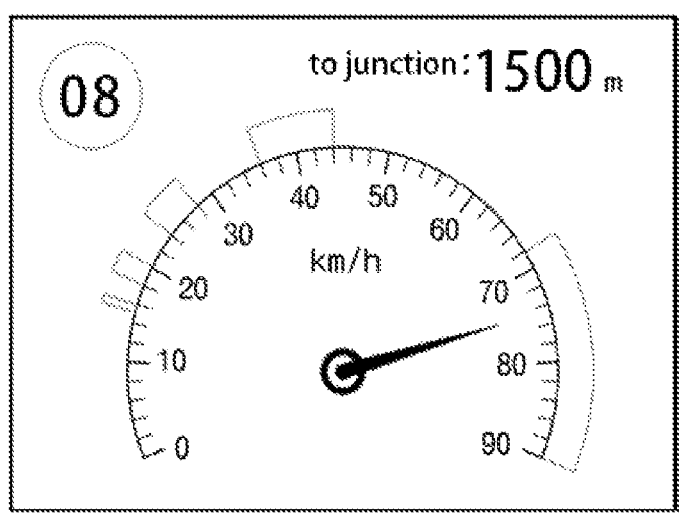
FIG. 2 illustrates an embodiment of displaying of a dashboard.

In this embodiment, there are a total of five induction speed intervals [$v_2$, $v_1$], as shown in FIG. 2, the five induction speed intervals are respectively [68, 90] (km/h), [36, 44] (km/h), [24, 28] (km/h), [18, 20] (km/h) and [15, 16] (km/h).

The driver of the vehicle can drive at any speed in the two induction speed intervals, and can always cross the traffic light junction on the road ahead when the traffic light is green, thereby avoiding vehicle stopping and causing congestion at the junction on the road.

Figure 3:
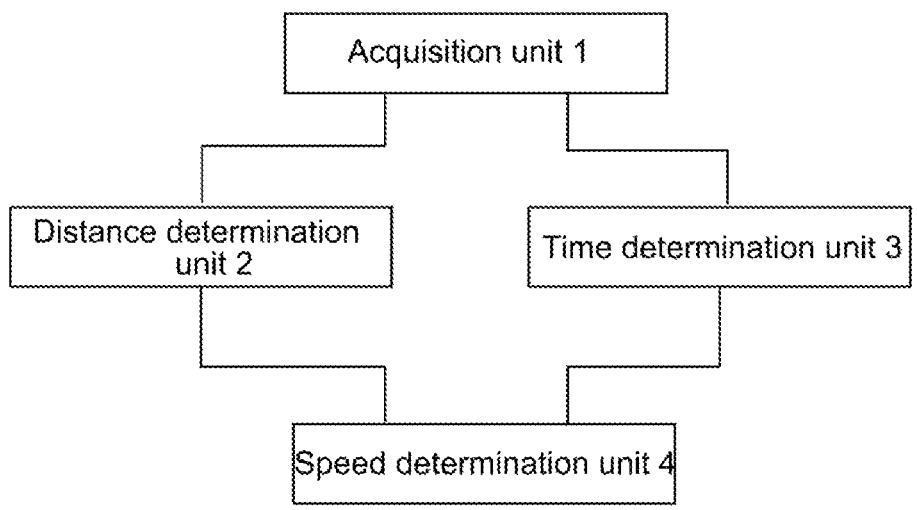
FIG. 3 is a schematic structural diagram of a traffic light-based vehicle speed induction system according to an embodiment of the present disclosure.

The present disclosure further provides a traffic light-based vehicle speed induction system, which enables a driver to adjust the vehicle speed in a timely manner according to the actual conditions of the road, and control the vehicle speed in the induction speed intervals when approaching the traffic light junction on the road, so as to cross the traffic light junction on the road during the green-light period. As shown in FIG. 3, the traffic light-based vehicle speed induction system of the present disclosure comprises an acquisition unit 1, a distance determination unit 2, a time determination unit 3, and a speed determination unit 4.

In the above, the acquisition unit 1 acquires a position of a traffic light junction on the road ahead, the current position and the current time of travelling of a vehicle, and time parameters of a traffic light; the distance determination unit 2 determines the distance between the vehicle and the traffic light junction on the road according to the position of the traffic light junction on the road and the current position of travelling of the vehicle; the time determination unit 3 determines a plurality of effective time intervals of continued travelling of the vehicle according to the time parameters of the traffic light and the current time of travelling of the vehicle; and the speed determination unit 4 determines a plurality of induction speed intervals of travelling of the vehicle according to the distance and the effective time intervals, wherein with a speed within any of the induction speed intervals, a driver can be enabled to cross the traffic light junction on the road during the green-light period.

The traffic light-based vehicle speed induction system of the present disclosure can be provided on a vehicle to provide a reference for the driver of the vehicle in real time; or can be provided as a junction sign and placed at a fixed position near a traffic light junction on the road to provide a reference for the passing vehicles.

For example, the contents displayed on a vehicle dashboard is duplicated to an LED display screen installed on the roadside or above the lane, prompting the passing vehicles to travel, when passing under the display screen, at a constant speed in the induction speed intervals to the traffic light junction on the road, which can ensure that the vehicles cross the junction on the road during the green-light period.

Further, the present disclosure also provides a vehicle equipped with the traffic light-based vehicle speed induction system as described above. Optionally, the vehicle of the present disclosure is further provided with a dashboard connected to the traffic light-based vehicle speed induction system and used for displaying a plurality of induction speed intervals of the vehicle speed induction system.

Compared with the prior art, the traffic light-based vehicle speed induction system and the vehicle of the present disclosure have the same advantageous effects as the traffic light-based vehicle speed induction method, which will not be described again herein.

The embodiments of the present disclosure are described in detail with reference to the drawings. However, the present disclosure is not limited to the embodiments described above. Various changes can be made within the range of the knowledge of a person of ordinary skills in the art without departing from the spirit of the present disclosure.

The invention claimed is:

1. A traffic light-based vehicle speed induction method, comprising steps of, by a computing device based on execution of instructions stored in a computer readable medium:
   acquiring a position of a traffic light junction on a road ahead, a current position and current time of travelling of a vehicle, and time parameters of a traffic light;
   determining a distance between the vehicle and the traffic light junction on the road according to the position of the traffic light junction on the road and the current position of travelling of the vehicle;
   determining a plurality of effective time intervals of continued travelling of the vehicle according to the time parameters of the traffic light and the current time of travelling of the vehicle; and
   determining a plurality of induction speed intervals of travelling of the vehicle according to the distance and the effective time intervals, wherein with a speed within any of the induction speed intervals, a driver can be enabled to cross the traffic light junction on the road during a green-light period, wherein the time parameters comprise a time period of the traffic light, a starting time of the time period, a green-light period, a yellow-light period and a red-light period in the time period, the step of determining a plurality of effective time intervals of continued travelling of the vehicle according to the time parameters of the traffic light and the current time of travelling of the vehicle comprises:

determining a time remainder according to a formula as follows:

the time remainder=(the current time−the starting time) % the time period, where % represents a remainder operation;

determining an initial value of the starting time of continued travelling of the vehicle according to the green-light period, the yellow-light period and the red-light period within the time period and the time remainder:

wherein if the time remainder is smaller than the green-light period, the green light at the traffic light junction on the road is currently lit, the initial value of the starting time=0, the initial value of the ending time=the green-light period−the time remainder, and the value is a special case; and for the second green-light period, the initial value of the starting time=the time period−the time remainder, and the initial value of the ending time=the initial value of the starting time+the green-light period;

if the time remainder is greater than the green-light period and smaller than the sum of the preen-light period and the yellow-light period, the yellow light at the traffic light junction on the road is currently lit, the initial value of the starting time=the time period−the time remainder, and the initial value of the ending time=the initial value of the starting time+the green-light period;

if the time remainder is greater than the sum of the green-light period and the yellow-light period, the red light at the traffic light junction on the road is currently lit, the initial value of the starting time=the time period−the time remainder, and the initial value of the ending time=the initial value of the starting time+the green-light period;

determining a plurality of effective time intervals [$T_1$, $T_2$] according to a formula as follows:

$$\begin{cases} T_1 = \text{the intial value of the starting time} + nT \\ T_2 = \text{the intial value of the ending time} + nT \end{cases},$$

where $T_1$ represents the starting time in one effective time interval of the continued travelling of the vehicle, $T_2$ represents ending time in one effective time interval of the continued travelling of the vehicle, T represents a value of one time period of the traffic light, and n is an integer greater than or equal to 0; and if the green light at the traffic light junction on the road is currently lit, the initial value of the starting time and the initial value of the ending time in the formula are the initial value of the starting time and the initial value of the ending time of the second period, and the first set of data is calculated separately as a special case.

2. The traffic light-based vehicle speed induction method according to claim 1, wherein the step of determining a plurality of induction speed intervals of travelling of the vehicle according to the distance and the effective time intervals comprises:

determining multiple pairs of extreme speed values $v_i$ according to a formula as follows:

$$v_i = \frac{S}{T_i},$$

where S represents distance between the vehicle and the traffic light junction on the road, i=1, 2;

determining a plurality of induction speed intervals [$V_2$, $V_1$] according to a formula as follows:

$$\begin{cases} V_1 = \begin{cases} V_H, & v_1 > V_H \\ v_1, & V_L \leq v_1 \leq V_H \\ \text{invalid value}, & v_1 < V_L \end{cases} \\ V_2 = \begin{cases} V_L, & v_2 < V_L \\ v_2, & V_H \geq v_2 \geq V_L \\ \text{invalid value}, & v_2 > V_H \end{cases} \end{cases}$$

wherein the maximum speed limit of the vehicle is represented by $V_H$, and the minimum speed limit of the vehicle is represented by $V_L$; and the reason why there is the invalid value is that in the case where the lowest speed value of the speed interval is higher than the maximum speed limit of the vehicle or the maximum speed limit is lower than the minimum speed limit of the vehicle, the calculation of the speed interval makes no sense and no calculation is made.

3. The traffic light-based vehicle speed induction method according to claim 1, wherein the step of acquiring a position of a traffic light junction on the road ahead comprises: determining a position of the traffic light junction on the road according to the GPS coordinates of the traffic light junction on the road.

4. The traffic light-based vehicle speed induction method according to claim 1, further comprising:
displaying the induction speed intervals by a dashboard.

5. The traffic light-based vehicle speed induction method according to claim 4, wherein the induction speed intervals are displayed in green.

6. A traffic light-based vehicle speed induction system, comprising:

an acquisition unit for acquiring, by a computing device based on execution of instructions stored in a computer readable medium, a position of a traffic light junction on the road ahead, a current position and current time of travelling of a vehicle, and time parameters of a traffic light;

a distance determination unit for determining, by a computing device based on execution of instructions stored in a computer readable medium, a distance between the vehicle and the traffic light junction on the road according to the position of the traffic light junction on the road and the current position of travelling of the vehicle;

a time determination unit for determining, by a computing device based on execution of instructions stored in a computer readable medium, a plurality of effective time intervals of continued travelling of the vehicle according to the time parameters of the traffic light and the current time of travelling of the vehicle; and a speed determination unit for determining, by a computing device based on execution of instructions stored in a computer readable medium, a plurality of induction speed intervals of travelling of the vehicle according to the distance and the effective time intervals, wherein with a speed within any of the induction speed intervals, a driver can be enabled to cross the traffic light junction on the road during the green-light period, wherein the time parameters comprise a time period of the traffic light, a starting time of the time period, a green-light period, a yellow-light period and a red-light period in the time period, the step of determining a plurality of effective time intervals of continued travelling of the vehicle according to the time parameters of the traffic light and the current time of travelling of the vehicle comprises:

determining a time remainder according to a formula as follows:

the time remainder=(the current time−the starting time) % the time period, where % represents a remainder operation;

determining an initial value of the starting time of continued travelling of the vehicle according to the green-light period, the yellow-light period and the red-light period within the time period and the time remainder:

wherein if the time remainder is smaller than the green-light period, the green light at the traffic light junction on the road is currently lit, the initial value of the starting time=0, the initial value of the ending time=the green-light period−the time remainder, and the value is a special case; and for the second green-light period, the initial value of the starting time=the time period−the time remainder, and the initial value of the ending time=the initial value of the starting time+the green-light period;

if the time remainder is greater than the green-light period and smaller than the sum of the green-light period and the yellow-light period, the yellow light at the traffic light junction on the road is currently lit, the initial value of the starting time=the time period−the time remainder, and the initial value of the ending time=the initial value of the starting time+the green-light period;

if the time remainder is greater than the sum of the green-light period and the yellow-light period, the red light at the traffic light junction on the road is currently lit, the initial value of the starting time=the time period−the time remainder, and the initial value of the ending time=the initial value of the starting time+the green-light period;

determining a plurality of effective time intervals [$T_1$, $T_2$] according to a formula as follows:

$$\begin{cases} T_1 = \text{the initial value of the starting time} + nT \\ T_2 = \text{the intial value of the ending time} + nT \end{cases},$$

where $T_1$ represents the starting time in one effective time interval of the continued travelling of the vehicle, $T_2$ represents ending time in one effective time interval of the continued travelling of the vehicle, T represents a value of one time period of the traffic light, and n is an integer greater than or equal to 0; and if the green light at the traffic light junction on the road is currently lit, the initial value of the starting time and the initial value of the ending time in the formula are the initial value of the starting time and the initial value of the ending time of the second period, and the first set of data is calculated separately as a special case.

7. A vehicle, wherein the vehicle is provided with the traffic light-based vehicle speed induction system according to claim 6.

8. The vehicle according to claim 7, wherein the vehicle is further provided with a dashboard connected to the traffic light-based vehicle speed induction system and used for displaying a plurality of induction speed intervals of the vehicle speed induction system.

9. The traffic light-based vehicle speed induction method according to claim 2, wherein the step of acquiring a position of a traffic light junction on the road ahead comprises: determining a position of the traffic light junction on the road according to the GPS coordinates of the traffic light junction on the road.

10. The traffic light-based vehicle speed induction method according to claim 2, further comprising:
displaying the induction speed intervals by a dashboard.

11. The traffic light-based vehicle speed induction method according to claim 3, further comprising:
displaying the induction speed intervals by a dashboard.

12. The traffic light-based vehicle speed induction method according to claim 10, wherein the induction speed intervals are displayed in green.

* * * * *

UNITED STATES PATENT AND TRADEMARK OFFICE
CERTIFICATE OF CORRECTION

PATENT NO. : 11,361,659 B2
APPLICATION NO. : 16/441117
DATED : June 14, 2022
INVENTOR(S) : Chun-Ming Li It is certified that error appears in the above-identified patent and that said Letters Patent is hereby corrected as shown below:

In the Claims

Column 11, Line 33, in Claim 1, please change from:
"period and smaller than the sum of the preen-light"

To:
--period and smaller than the sum of the green-light--

Signed and Sealed this
Twenty-second Day of November, 2022

Katherine Kelly Vidal
Director of the United States Patent and Trademark Office